(12) United States Patent
Li et al.

(10) Patent No.: US 11,907,377 B2
(45) Date of Patent: Feb. 20, 2024

(54) SUPPORTING SELF-MODIFYING GRAPHICS WORKLOADS IN FULLY VIRTUALIZED GRAPHICS ARCHITECTURES

(71) Applicant: Intel Corporation, Santa Clara, CA (US)

(72) Inventors: Weinan Li, Shanghai (CN); Yan Zhao, Shanghai (CN); Zhi Wang, Tampere (FI)

(73) Assignee: Intel Corporation, Santa Clara, CA (US)

( * ) Notice: Subject to any disclaimer, the term of this patent is extended or adjusted under 35 U.S.C. 154(b) by 385 days.

(21) Appl. No.: 17/251,307

(22) PCT Filed: Oct. 30, 2018

(86) PCT No.: PCT/CN2018/112630
§ 371 (c)(1),
(2) Date: Dec. 11, 2020

(87) PCT Pub. No.: WO2020/087264
PCT Pub. Date: May 7, 2020

(65) Prior Publication Data
US 2021/0256139 A1   Aug. 19, 2021

(51) Int. Cl.
*G06F 21/57* (2013.01)
*G06F 21/84* (2013.01)
(Continued)

(52) U.S. Cl.
CPC ............ *G06F 21/577* (2013.01); *G06F 21/84* (2013.01); *G06T 1/20* (2013.01); *G06T 1/60* (2013.01); *G06F 2221/034* (2013.01)

(58) Field of Classification Search
CPC .. G06F 21/577; G06F 21/84; G06F 2221/034; G06F 9/30087; G06F 9/45558;
(Continued)

(56) References Cited

U.S. PATENT DOCUMENTS 9,805,439 B2 * 10/2017 Diard .................. G06F 9/545
10,503,512 B2 * 12/2019 Craske ................ G06F 9/3834
(Continued)

FOREIGN PATENT DOCUMENTS

CN    107077384 A    8/2017
CN    107608756 A    1/2018
(Continued)

OTHER PUBLICATIONS

International Search Report and Written Opinion for International Application No. PCT/CN2018/112630, dated Jul. 29, 2019, 9 pages.
(Continued)

*Primary Examiner* — Han Yang
(74) *Attorney, Agent, or Firm* — Jordan IP Law, LLC

(57) ABSTRACT

Systems, apparatuses and methods may provide for technology that sets a write protection flag in a guest command buffer associated with a virtual machine and injects a semaphore command into a shadow command buffer in response to a fault. The fault is to correspond to a write of a graphics command to the guest command buffer by code executing in graphics hardware. In one example, the technology also conducts a security scan of the graphics command in response to a context switch in the graphics hardware, wherein the context switch is to be associated with the semaphore command.

20 Claims, 7 Drawing Sheets

(51) Int. Cl.
*G06T 1/20* (2006.01)
*G06T 1/60* (2006.01)

(58) Field of Classification Search
CPC . G06F 2009/45579; G06F 2009/45583; G06F 2009/45587; G06T 1/20; G06T 1/60
See application file for complete search history.

(56) References Cited

U.S. PATENT DOCUMENTS

| | | | |
|---|---|---|---|
| 10,853,118 B2* | 12/2020 | Tian | G06F 9/45558 |
| 2016/0055613 A1* | 2/2016 | Ai | G06F 9/00 345/418 |
| 2016/0139922 A1 | 5/2016 | Craske et al. | |

FOREIGN PATENT DOCUMENTS

| | | |
|---|---|---|
| WO | 2015135181 A1 | 9/2015 |
| WO | 2017107001 A1 | 6/2017 |

OTHER PUBLICATIONS

Kun Tian et al., "A Full GPU Virtualization Solution with Mediated Pass-Through", Proceedings of USENIX ATC '14: 2014 USENIX Annual Technical Conference, Jun. 19, 2014, 13 pages, Philadelphia PA.

* cited by examiner

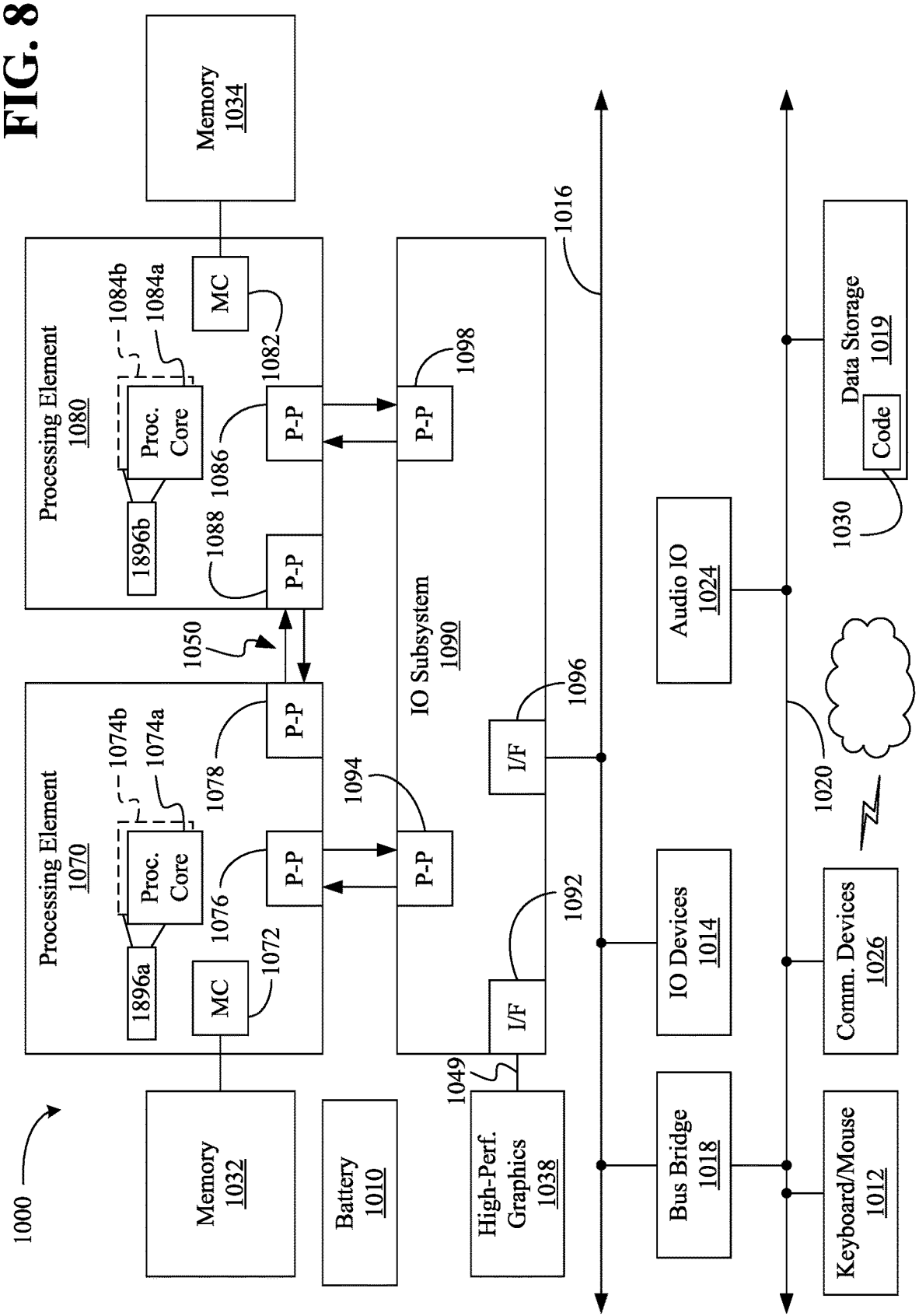

SUPPORTING SELF-MODIFYING GRAPHICS WORKLOADS IN FULLY VIRTUALIZED GRAPHICS ARCHITECTURES

CROSS REFERENCE TO RELATED APPLICATIONS

This application is a U.S. National Phase Patent Application which claims benefit to International Patent Application No. PCT/CN2018/112630 filed on Oct. 30, 2018.

TECHNICAL FIELD

Embodiments generally relate to graphics architectures. More particularly, embodiments relate to supporting self-modifying graphics workloads in fully virtualized graphics architectures.

BACKGROUND

Virtualized graphics processing unit (vGPU) architectures may execute graphics workloads (e.g., three-dimensional/3D and/or computational workloads) in a virtual machine (VM), which emulates a computing system. If the graphics workload includes self-modifying code that populates a command buffer within the VM during execution, security concerns may arise.

BRIEF DESCRIPTION OF THE DRAWINGS

The various advantages of the embodiments will become apparent to one skilled in the art by reading the following specification and appended claims, and by referencing the following drawings, in which:

FIG. 8 is a block diagram of an example of a multi-processor based computing system according to an embodiment.

DESCRIPTION OF EMBODIMENTS

Figure 1:
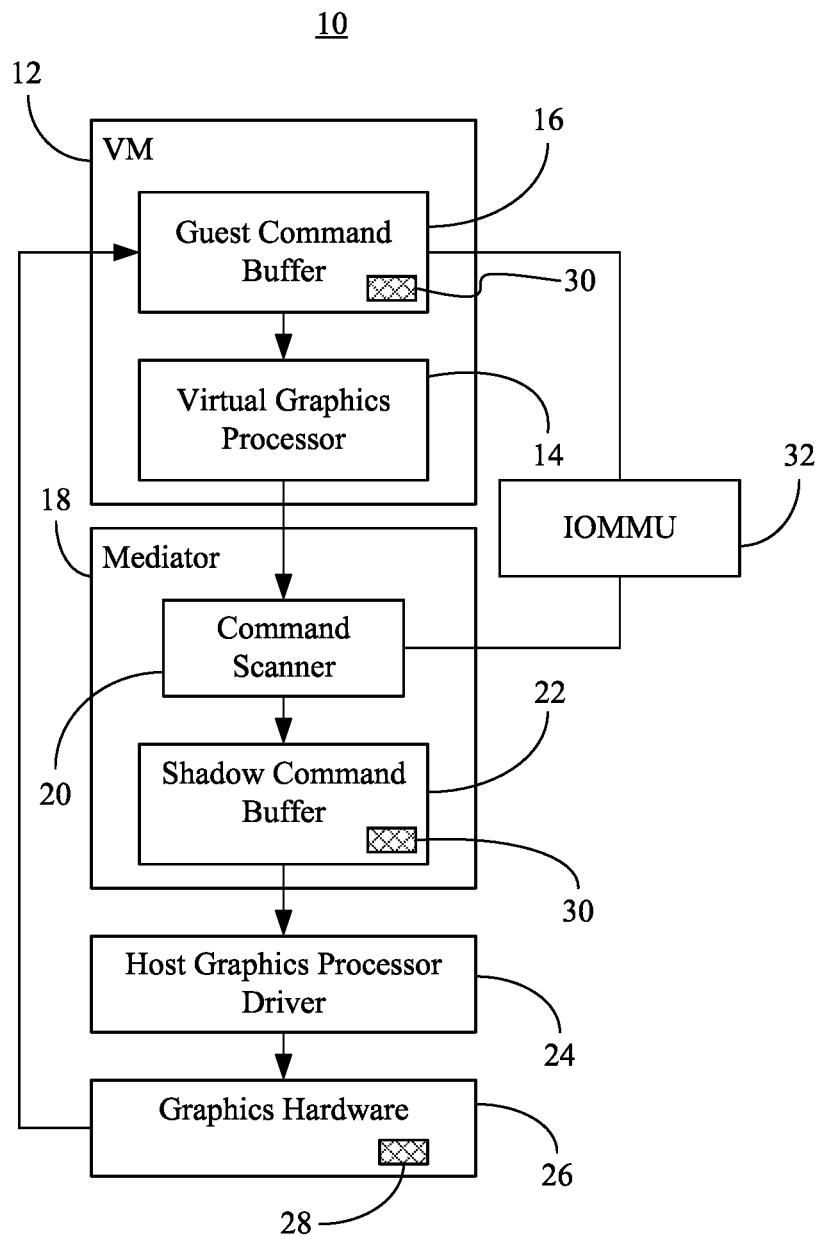
FIG. 1 is a block diagram of an example of a virtualized graphics architecture that supports privileged self-modifying code according to an embodiment.

Turning now to FIG. 1, a virtualized graphics architecture 10 is shown in which a virtual machine (VM) 12 includes a virtual graphics processor 14 (e.g., vGPU) and a guest command buffer 16 (e.g., ring buffer, privileged batch buffer). The illustrated guest command buffer 16 generally stores commands associated with a graphics workload (e.g., 3D and/or compute workload), wherein the virtual graphics processor 14 retrieves commands from the guest command buffer 16 and submits them to a mediator 18 for further processing. In one example, the architecture 10 includes multiple independent instances of the VM 12 and each VM 12 communicates with the mediator 18 via a virtual machine manager (VMM, e.g., hypervisor). The illustrated mediator 18 includes a command scanner 20 that analyzes the commands from the guest command buffer 16 to determine whether the commands present a security risk. Commands that do not present a security risk are placed into a shadow command buffer 22, which generally mirrors the guest command buffer 16. In an embodiment, a host graphics processor driver 24 retrieves the commands from the shadow command buffer 22 and submits/dispatches them as a workload to graphics hardware 26 (e.g., array of highly parallelized graphics execution units/EUs, graphics pipeline, etc.).

In one example, the workload executed by the graphics hardware 26 includes self-modifying code 28, which writes a graphics command 30 to the guest command buffer 16. The self-modifying code 28 might provide for optimized media decoder/encoder operations, general-purpose computing shader operations that involve cross-engine cooperation, and so forth. In an embodiment, the graphics hardware 26 isolates unprivileged self-modifying commands in the workload for security scanning. If the self-modifying code 28 is privileged code (e.g., code with system level or "Ring 0" privileges), however, the graphics hardware 26 may lack the ability to scan the self-modifying code 28 for security risks. In the illustrated example, an input/output memory mapped unit (IOMMU) 32 sets a write protection flag (e.g. read/write bit) of the guest command buffer 16 so that attempts by the self-modifying code 28 to write the graphics command 30 to the guest command buffer 16 will generate a fault (e.g., direct memory access/DMA write fault). When the fault occurs, the illustrated mediator 18 injects/writes a semaphore (e.g., wait) command (not shown) into the shadow command buffer 22. In an embodiment, the semaphore command is a synchronization instruction that controls access to the graphics hardware 26, which may be shared between running threads.

Thus, when the illustrated graphics hardware 26 encounters the semaphore command in the shadow command buffer 22, the graphics hardware 26 will initiate a context switch and stop execution. In response to the context switch, the command scanner 20 conducts a security scan of the graphics command 30. If the security scan does not detect a security risk, the illustrated command scanner 20 overwrites the semaphore command with the graphics command 30. Accordingly, the mediator 18 may resume execution by the graphics hardware 26 of the command 30 from the shadow command buffer 22.

The illustrated solution therefore enables the privileged self-modifying code 28 to be supported by the virtualized graphics architecture 10 without concern over security breaches (e.g., malware, spyware). Moreover, the illustrated solution may be considered a "lazy" scan and update system to the extent that it does not attempt to scan the command 30 immediately upon the write of the command 30 to the guest command buffer 16. Rather, the illustrated solution waits until the graphics hardware 26 is ready to execute the command 30. Such an approach may be advantageous when the self-modifying code 28 conducts multiple writes to the guest command buffer 16 before the graphics hardware 26 is ready to execute the commands. In this case, the command scanner 20 can achieve greater efficiency and minimize the performance impact by overwriting multiple instances of the semaphore command in the shadow command buffer 22 at once.

Figure 2:
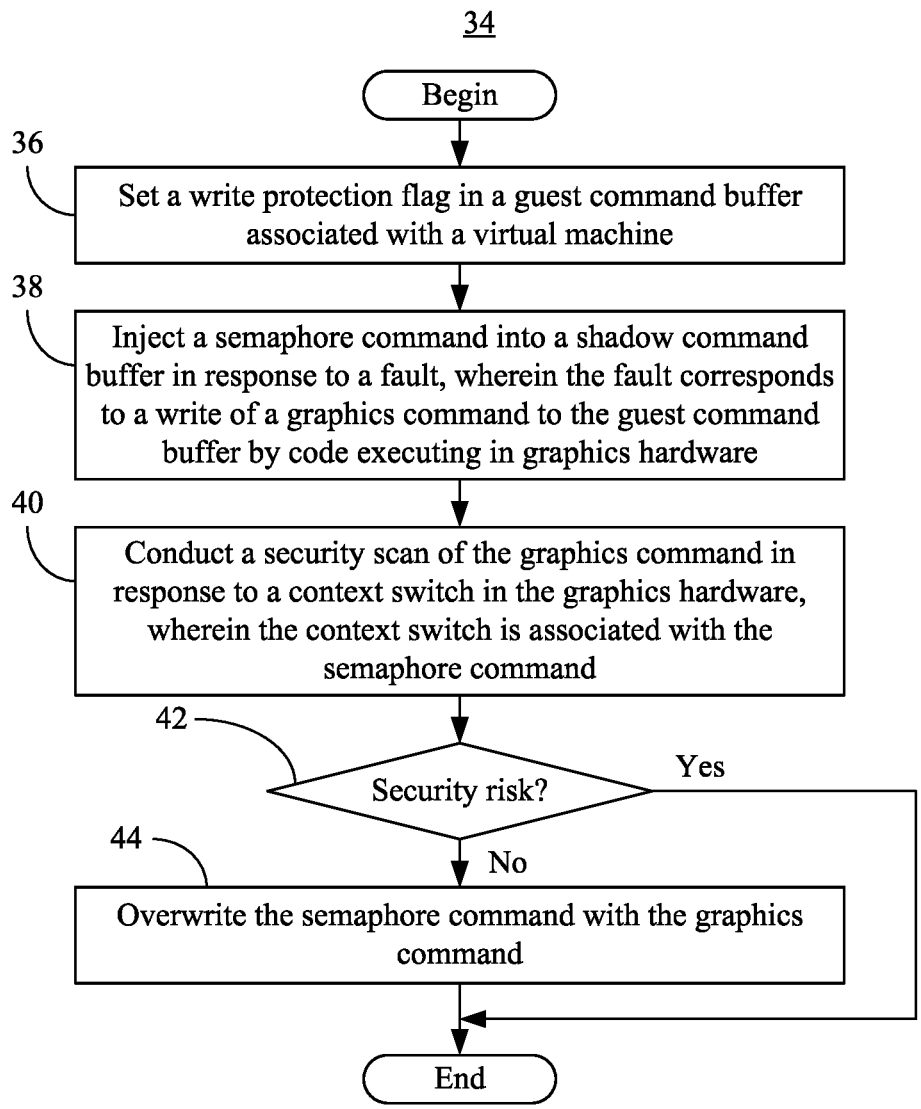
FIG. 2 is a flowchart of an example of a method of operating a security-enhanced computing system according to an embodiment.

FIG. 2 shows a method 34 of operating a security-enhanced computing system. The method 34 may generally be implemented in a virtual graphics architecture such as, for example, the architecture 10 (FIG. 1), already discussed. More particularly, the method 34 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 34 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 36 provides for setting a write protection flag in a guest command buffer associated with a virtual machine. In one example, the guest command buffer is accessible via a DMA-capable I/O (input/output) bus. A semaphore command is injected into a shadow command at block 38 in response to a fault. In the illustrated example, the fault corresponds to a write of a graphics command to the guest command buffer by code executing in graphics hardware. In an embodiment, the code executing in the graphics hardware is self-modifying and/or privileged code. As will be discussed in greater detail, block 38 may include determining, based on a command boundary bitmap, whether the fault occurred with respect to a command area in the guest command buffer or a data area in the guest command buffer. If the fault occurred with respect to a command area in the guest command buffer, block 38 injects the semaphore command into a command area of the shadow command buffer. By contrast, if the fault occurred with respect to a data area in the guest command buffer, block 38 may inject the semaphore command into a command area adjacent to a data area of the shadow command buffer.

A security scan of the graphics command is conducted at block 40 in response to a context switch in the graphics hardware, wherein the context switch is associated with the semaphore command. If it is determined at block 42 that the security scan does not detect a security risk in the graphics command, illustrated block 44 overwrites the semaphore command with the graphics command. The graphics hardware may then be permitted to continue with execution of the graphics command from the shadow command buffer. If it is determined at block 42 that the security scan detects a security risk in the graphics command, block 44 may be bypassed. The illustrated method 34 therefore enables privileged self-modifying code to be supported without concern over security breaches (e.g., malware, spyware). Moreover, the method 34 may be advantageous when the self-modifying code 28 conducts multiple writes to the guest command buffer before the graphics hardware is ready to execute the commands. In this case, the command scanner can achieve greater efficiency by overwriting multiple instances of the semaphore command in the shadow command buffer at once.

Figure 3:
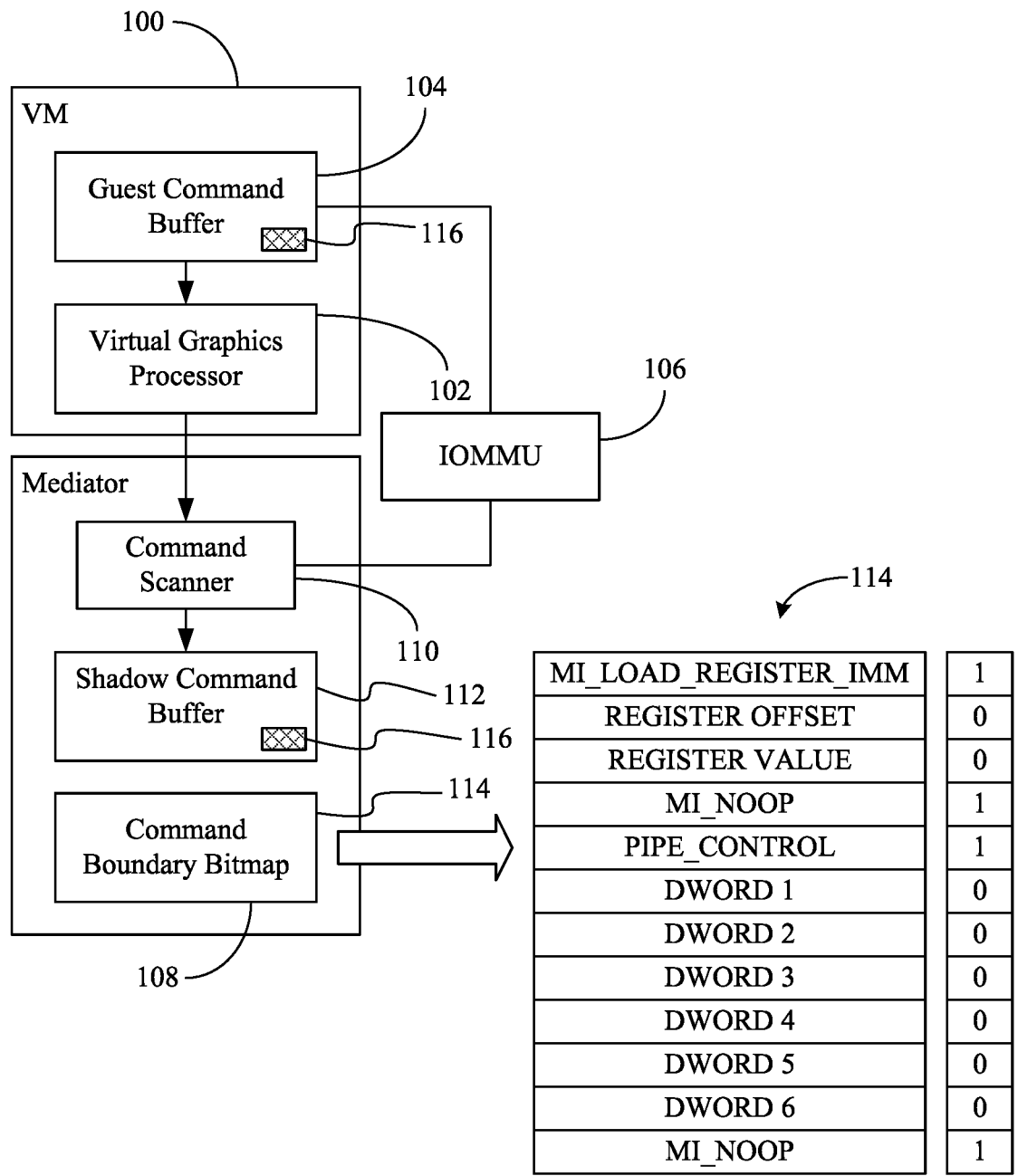
FIG. 3 is an illustration of an example of a command boundary bitmap according to an embodiment.

FIG. 3 shows a VM 100 that includes a virtual graphics processor 102 and a guest command buffer 104 that is coupled to an IOMMU 106. The IOMMU 106 generally uses a page table to map device-visible virtual addresses (e.g., device addresses, I/O addresses) to physical addresses. In the illustrated example, a mediator 108 receives commands from the virtual graphics processor 102, wherein a command scanner 110 analyzes the commands to determine whether the commands present a security risk. Commands that do not present a security risk may be placed into a shadow command buffer 112, as already discussed.

In an embodiment, the command scanner 110 generates a command boundary bitmap 114 when the VM 100 submits a graphics workload. The bitmap 114 generally indicates the command and data layout of the guest command buffer 104. In the illustrated example, the right column of the bitmap 114 indicates whether the corresponding area in the left column is a command area or a data area. Thus, an immediate register load operation (e.g., MI_LOAD_REGISTER_IMM), a no option operation (e.g., MI_NOOP) or a pipeline control operation (e.g., PIPE_CONTROL) might be a graphics command 116 that is written to a command area of the guest command buffer 104 by privileged self-modifying code. By contrast, a register offset, a register value or one or more double words (e.g., DWORD 1 to DWORD 6) may be written to data areas of the guest command buffer 104 by privileged self-modifying code. As will be discussed in greater detail, the placement of semaphore commands injected into the guest command buffer 104 may be based on the type of write fault that occurs with respect to the guest command buffer 104.

Figure 4:
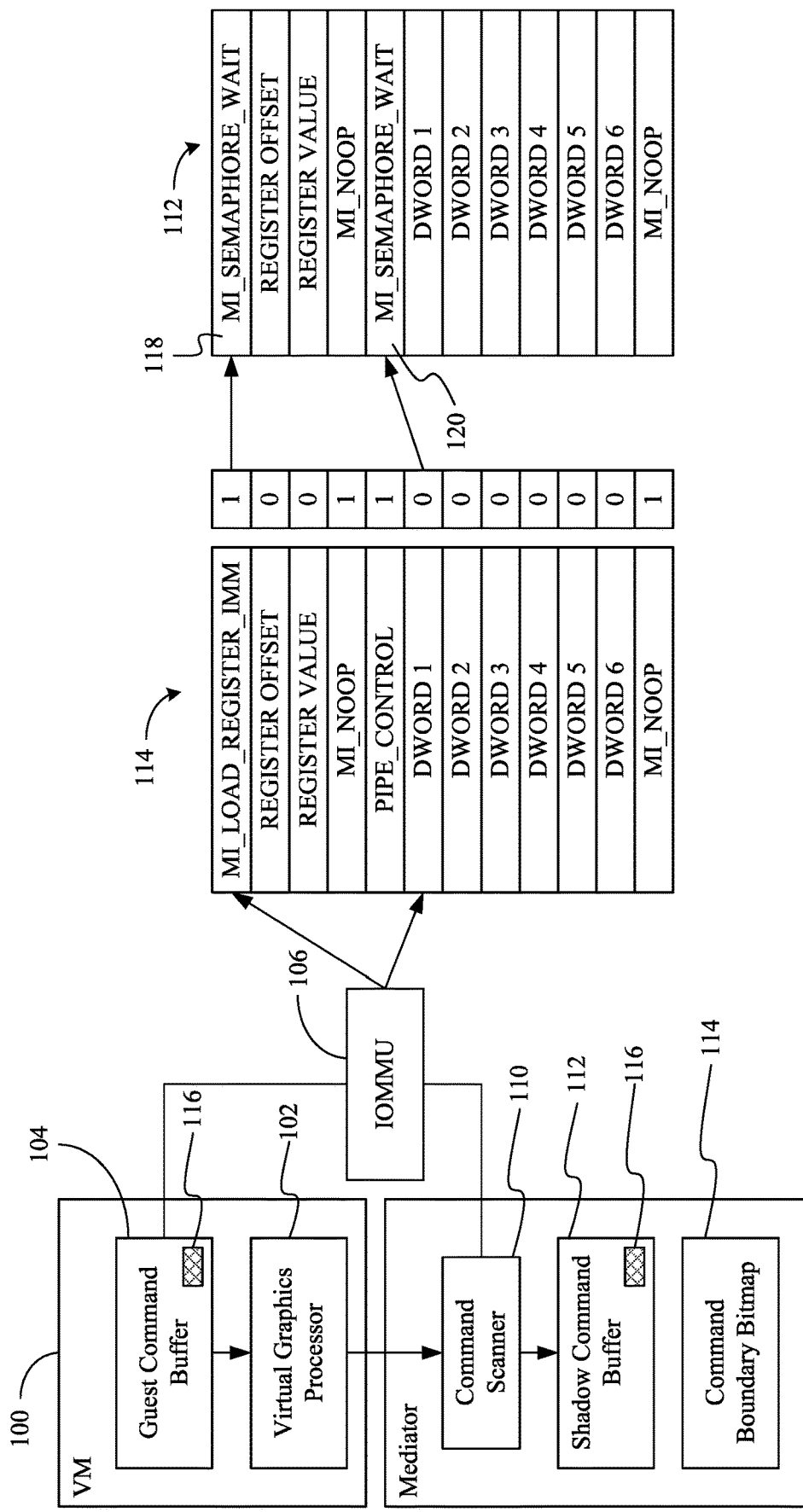
FIG. 4 is an illustration of an example of an injection of semaphore commands into a shadow buffer according to an embodiment.

For example, FIG. 4 demonstrates that when a write of the immediate load register operation to a command area in the guest command buffer 104 generates a fault, the command scanner 110 writes a first semaphore command 118 to the corresponding command area in the shadow command buffer 112. By contrast, when a write of a double word to a data area in the guest command buffer 104 generates a fault, the command scanner 110 writes a second semaphore command 120 to a command area adjacent to (e.g., immediately preceding) the corresponding data area in the shadow command buffer 112. Of particular note is that writing the second semaphore command 120 to the corresponding data area might result in the graphics hardware failing to interpret the second semaphore command 120 as a command.

Figure 5:
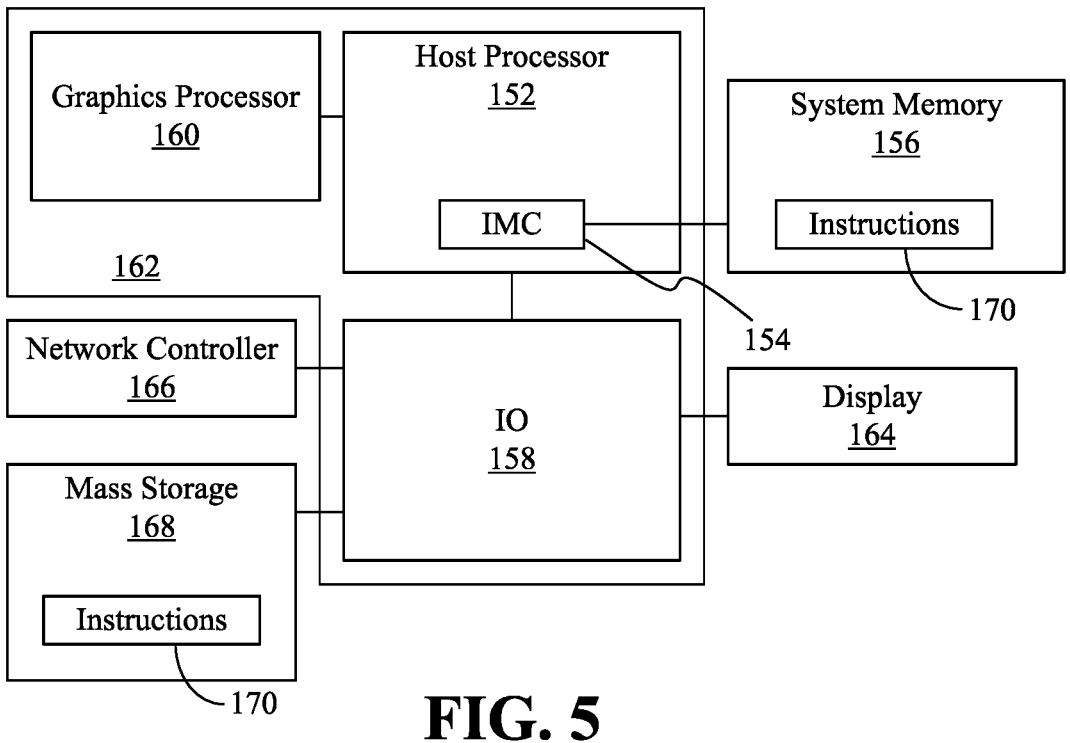
FIG. 5 is a block diagram of an example of a security-enhanced computing system according to an embodiment.

Turning now to FIG. 5, a security-enhanced computing system 150 is shown. The system 150 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 150 includes a host processor 152 (e.g., central processing unit/CPU) having an integrated memory controller (IMC) 154 that is coupled to a system memory 156.

The illustrated system 150 also includes an input output (10) module 158 implemented together with the host processor 152 and a graphics processor 160 on a semiconductor die 162 as a system on chip (SoC). The illustrated IO module 158 communicates with, for example, a display 164 (e.g., touch screen, liquid crystal display/LCD, light emitting diode/LED display), a network controller 166 (e.g., wired and/or wireless), and mass storage 168 (e.g., hard disk drive/HDD, optical disk, solid state drive/SSD, flash memory). In an embodiment, the host processor 152, the 10 module 158 and/or the graphics processor 160 execute instructions 170 retrieved from the system memory 156 and/or the mass storage 168 to perform one or more aspects of the method 34 (FIG. 2), already discussed.

Thus, execution of the instructions 170 causes the computing system 150 to set a write protection flag in a guest command buffer associated with a virtual machine and inject a semaphore command into a shadow command buffer in response to a fault, wherein the fault corresponds to a write of a graphics command to the guest command buffer by code (e.g., privileged self-modifying code) executing in graphics hardware such as, for example, the graphics processor 160. Execution of the instructions 170 may also cause the computing system 150 to conduct a security scan of the graphics command in response to a context switch in the graphics hardware. In one example, the context switch is associated with (e.g., triggered by) the semaphore command.

The illustrated computing system 150 therefore supports privileged self-modifying code in a fully virtualized graphics architecture without concern over security breaches (e.g., malware, spyware). Indeed, when the self-modifying code conducts multiple writes to the guest command buffer before the graphics hardware is ready to execute the commands, the system 150 can achieve greater efficiency by overwriting multiple instances of the semaphore command in the shadow command buffer concurrently.

Figure 6:
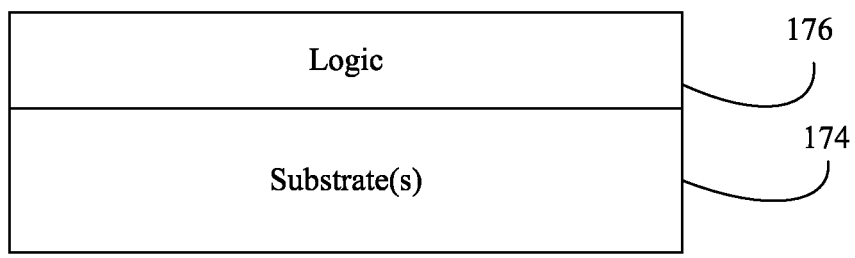
FIG. 6 is an illustration of an example of a semiconductor package apparatus according to an embodiment.

FIG. 6 shows a semiconductor apparatus 172 (e.g., chip, die, package). The illustrated apparatus 172 includes one or more substrates 174 (e.g., silicon, sapphire, gallium arsenide) and logic 176 (e.g., transistor array and other integrated circuit/IC components) coupled to the substrate(s) 174. In an embodiment, the logic 176 implements one or more aspects of the method 34 (FIG. 2), already discussed. Thus, the logic 176 may set a write protection flag in a guest command buffer associated with a virtual machine and inject a semaphore command into a shadow command buffer in response to a fault, wherein the fault corresponds to a write of a graphics command to the guest command buffer by code (e.g., privileged self-modifying code) executing in graphics hardware. In an embodiment, the logic 176 also conducts a security scan of the graphics command in response to a context switch in the graphics hardware. In one example, the context switch is associated with the semaphore command.

The logic 176 may be implemented at least partly in configurable logic or fixed-functionality hardware logic. In one example, the logic 176 includes transistor channel regions that are positioned (e.g., embedded) within the substrate(s) 174. Thus, the interface between the logic 176 and the substrate(s) 174 may not be an abrupt junction. The logic 176 may also be considered to include an epitaxial layer that is grown on an initial wafer of the substrate(s) 174.

Figure 7:
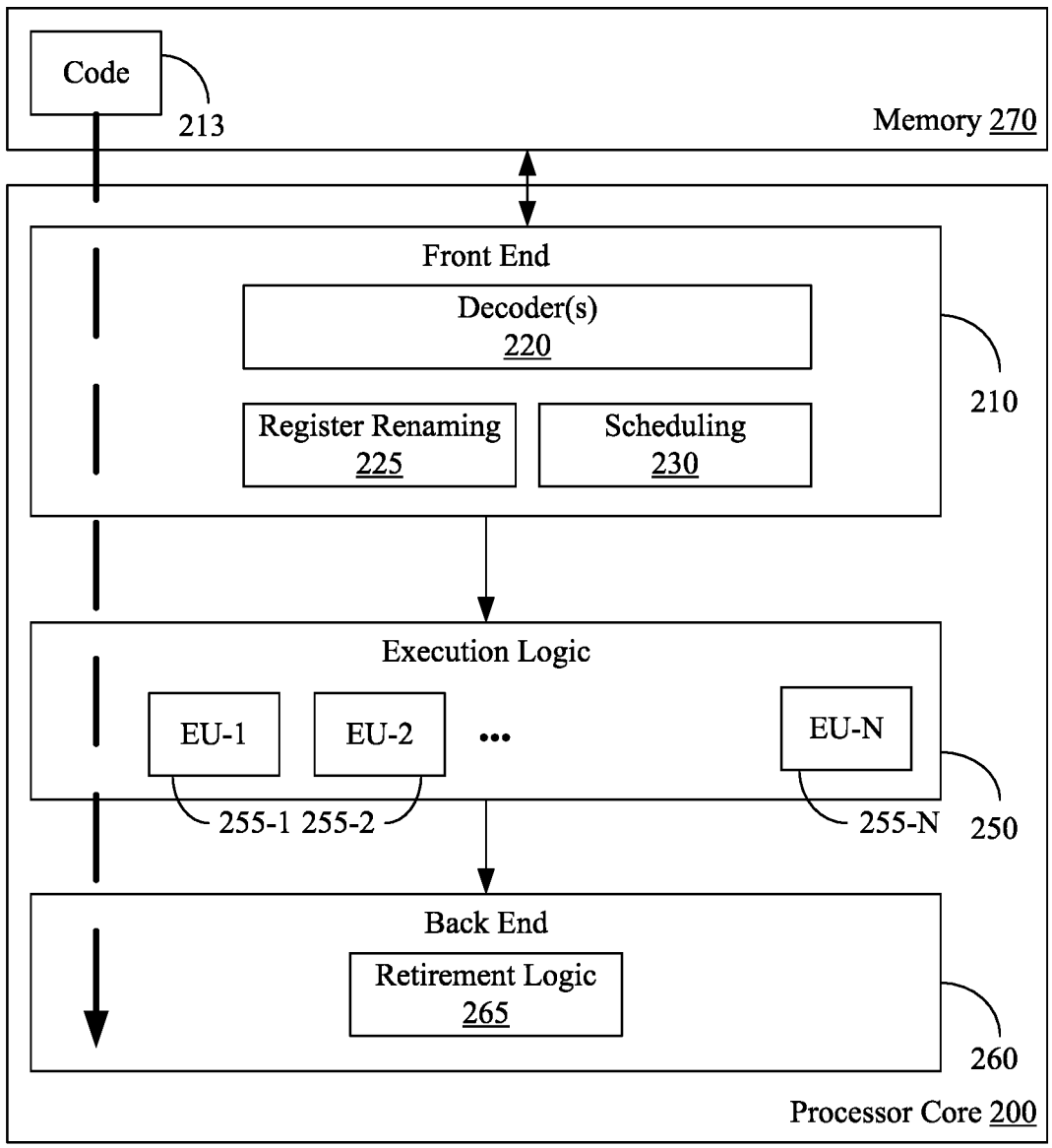
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement method 34 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 8, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 34 (FIG. 2), already discussed, and may be similar to the code 213 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 includes a security-enhanced computing system comprising graphics hardware, a guest command buffer to be associated with a virtual machine, and a processor including a shadow command buffer and logic to set a write protection flag in the guest command buffer, inject a semaphore command into the shadow command buffer in response to a fault, wherein the fault is to correspond to a write of a graphics command to the guest command buffer by code executing in the graphics hardware, and conduct a security scan of the graphics command in response to a context switch in the graphics hardware, wherein the context switch is to be associated with the semaphore command.

Example 2 includes the computing system of Example 1, wherein the logic is to overwrite the semaphore command with the graphics command if the security scan does not detect a security risk in the graphics command.

Example 3 includes the computing system of Example 1, wherein the semaphore command is injected into a command area of the shadow command buffer if the fault occurred with respect to a command area in the guest command buffer, and wherein the semaphore command is injected into a command area adjacent to a data area of the shadow command buffer if the fault occurred with respect to a data area in the guest command buffer.

Example 4 includes the computing system of Example 3, wherein the logic is to determine, based on a command boundary bitmap, whether the fault occurred with respect to the command area in the guest command buffer or the data area in the guest command buffer.

Example 5 includes the computing system of Example 1, wherein the code executing in the graphics hardware is to be self-modifying code.

Example 6 includes the computing system of any one of Examples 1 to 5, wherein the code executing in the graphics hardware is to be privileged code.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to set a write protection flag in a guest command buffer associated with a virtual machine, inject a semaphore command into a shadow command buffer in response to a fault, wherein the fault is to correspond to a write of a graphics command to the guest command buffer by code executing in graphics hardware, and conduct a security scan of the graphics command in response to a context switch in the graphics hardware, wherein the context switch is to be associated with the semaphore command.

Example 8 includes the semiconductor apparatus of Example 7, wherein the logic coupled to the one or more substrates is to overwrite the semaphore command with the graphics command if the security scan does not detect a security risk in the graphics command.

Example 9 includes the semiconductor apparatus of Example 7, wherein the semaphore command is injected into a command area of the shadow command buffer if the fault occurred with respect to a command area in the guest command buffer, and wherein the semaphore command is injected into a command area adjacent to a data area of the shadow command buffer if the fault occurred with respect to a data area in the guest command buffer.

Example 10 includes the semiconductor apparatus of Example 9, wherein the logic coupled to the one or more substrates is to determine, based on a command boundary bitmap, whether the fault occurred with respect to the command area in the guest command buffer or the data area in the guest command buffer.

Example 11 includes the semiconductor apparatus of any one of Examples 7 to 10, wherein the code executing in the graphics hardware is to be one or more of self-modifying code or privileged code.

Example 12 includes the semiconductor apparatus of any one of Examples 7 to 10, wherein the logic coupled to the one or more substrates includes transistor channel regions that are positioned within the one or more substrates.

Example 13 includes at least one computer readable storage medium comprising a set of executable program instructions, which when executed by a computing system, cause the computing system to set a write protection flag in a guest command buffer associated with a virtual machine, inject a semaphore command into a shadow command buffer in response to a fault, wherein the fault is to correspond to a write of a graphics command to the guest command buffer by code executing in graphics hardware, and conduct a security scan of the graphics command in response to a context switch in the graphics hardware, wherein the context switch is to be associated with the semaphore command.

Example 14 includes the at least one computer readable storage medium of Example 13, wherein the executable program instructions, when executed, cause the computing system to overwrite the semaphore command with the graphics command if the security scan does not detect a security risk in the graphics command.

Example 15 includes the at least one computer readable storage medium of Example 13, wherein the semaphore command is injected into a command area of the shadow command buffer if the fault occurred with respect to a command area in the guest command buffer, and wherein the semaphore command is injected into a command area adjacent to a data area of the shadow command buffer if the fault occurred with respect to a data area in the guest command buffer.

Example 16 includes the at least one computer readable storage medium of Example 15, wherein the executable program instructions, when executed, cause the computing system to determine, based on a command boundary bitmap, whether the fault occurred with respect to the command area in the guest command buffer or the data area in the guest command buffer.

Example 17 includes the at least one computer readable storage medium of Example 13, wherein the code executing in the graphics hardware is to be self-modifying code.

Example 18 includes the at least one computer readable storage medium of any one of Examples 13 to 17, wherein the code executing in the graphics hardware is to be privileged code.

Example 19 includes a method of operating a security-enhanced computing system comprising setting a write protection flag in a guest command buffer associated with a virtual machine, injecting a semaphore command into a shadow command buffer in response to a fault, wherein the fault corresponds to a write of a graphics command to the guest command buffer by code executing in graphics hardware, and conducting a security scan of the graphics command in response a context switch in the graphics hardware, wherein the context switch is associated with the semaphore command.

Example 20 includes the method of Example 19, further including overwriting the semaphore command with the graphics command if the security scan does not detect a security risk in the graphics command.

Example 21 includes the method of Example 19, wherein the semaphore command is injected into a command area of the shadow command buffer if the fault occurred with respect to a command area in the guest command buffer, and wherein the semaphore command is injected into a command area adjacent to a data area of the shadow command buffer if the fault occurred with respect to a data area in the guest command buffer.

Example 22 includes the method of Example 21, further including determining, based on a command boundary bitmap, whether the fault occurred with respect to the command area in the guest command buffer or the data area in the guest command buffer.

Example 23 includes the method of Example 19, wherein the code executing in the graphics hardware is self-modifying code.

Example 24 includes the method of Example 19, wherein the code executing in the graphics hardware is privileged code.

Thus, technology described herein leverages an IOMMU R/W bit (e.g., in a page table) to "trap" GPU DMA writes to a command buffer. A lazy scan and update scheme supports self-modifying GPU workloads in full GPU virtualization architectures. When a DMA write fault occurs (e.g., the command buffer modifies itself), a mediator injects a GPU semaphore command in the shadow command buffer with the relative offset of the fault in the guest command buffer. When the GPU "touches" the semaphore command, it will interrupt GPU execution if the GPU is going to execute it later. The self-modifying code may then start to generate the new GPU command in the guest GPU command buffer. When the GPU jumps to the shadow command buffer, it will encounter the injected GPU semaphore command, which triggers a GPU context switch. The mediator may then begin to scan the generated command buffer and update the shadow command buffer. During the update, the semaphore command is overwritten. When the scan and update are finished, the mediator may resume the execution of the shadow command buffer contents.

Accordingly, the technology described herein enables the use of self-modifying GPU workloads often seen in an optimized media decoder/encoder and general-purposed computing shaders that require cross-engine cooperation when decoding/encoding frames (e.g., where the computed results are leveraged as the input of other engines). Users may also have wider and more flexible choices in public and private computing, media cloud solutions based on GPU virtualization (e.g., high performance media transcoding), and so forth. Indeed, proprietary closed source GPGPU (general purpose GPU) shaders may be designed in a self-modifying GPU workload fashion and deployed on a computing system as described herein.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   graphics hardware;
   a guest command buffer to be associated with a virtual machine; and
   a processor including a shadow command buffer and logic to:
   set a write protection flag in the guest command buffer,
   inject a semaphore command into the shadow command buffer in response to a fault, wherein the fault is to correspond to a write of a graphics command to the guest command buffer by code executing in the graphics hardware,
   conduct a security scan of the graphics command in response to a context switch in the graphics hardware, wherein the context switch is to be associated with the semaphore command, and
   overwrite the semaphore command with the graphics command if the security scan does not detect a security risk in the graphics command.

2. The computing system of claim 1, wherein the semaphore command is injected into a command area of the shadow command buffer if the fault occurred with respect to a command area in the guest command buffer, and wherein the semaphore command is injected into a command area adjacent to a data area of the shadow command buffer if the fault occurred with respect to a data area in the guest command buffer.

3. The computing system of claim 2, wherein the logic is to determine, based on a command boundary bitmap, whether the fault occurred with respect to the command area in the guest command buffer or the data area in the guest command buffer.

4. The computing system of claim 1, wherein the code executing in the graphics hardware is to be self-modifying code.

5. The computing system of claim 1, wherein the code executing in the graphics hardware is to be privileged code.

6. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
   set a write protection flag in a guest command buffer associated with a virtual machine,
   inject a semaphore command into a shadow command buffer in response to a fault, wherein the fault is to correspond to a write of a graphics command to the guest command buffer by code executing in graphics hardware,
   conduct a security scan of the graphics command in response to a context switch in the graphics hardware, wherein the context switch is to be associated with the semaphore command, and overwrite the semaphore command with the graphics command if the security scan does not detect a security risk in the graphics command.

7. The semiconductor apparatus of claim 6, wherein the semaphore command is injected into a command area of the shadow command buffer if the fault occurred with respect to a command area in the guest command buffer, and wherein the semaphore command is injected into a command area adjacent to a data area of the shadow command buffer if the fault occurred with respect to a data area in the guest command buffer.

8. The semiconductor apparatus of claim 7, wherein the logic coupled to the one or more substrates is to determine, based on a command boundary bitmap, whether the fault occurred with respect to the command area in the guest command buffer or the data area in the guest command buffer.

9. The semiconductor apparatus of claim 6, wherein the code executing in the graphics hardware is to be one or more of self-modifying code or privileged code.

10. The semiconductor apparatus of claim 6, wherein the logic coupled to the one or more substrates includes transistor channel regions that are positioned within the one or more substrates.

11. At least one non-transitory computer readable storage medium comprising a set of executable program instructions, which when executed by a computing system, cause the computing system to:
set a write protection flag in a guest command buffer associated with a virtual machine;
inject a semaphore command into a shadow command buffer in response to a fault, wherein the fault is to correspond to a write of a graphics command to the guest command buffer by code executing in graphics hardware;
conduct a security scan of the graphics command in response to a context switch in the graphics hardware, wherein the context switch is to be associated with the semaphore command; and
overwrite the semaphore command with the graphics command if the security scan does not detect a security risk in the graphics command.

12. The at least one non-transitory computer readable storage medium of claim 11, wherein the semaphore command is injected into a command area of the shadow command buffer if the fault occurred with respect to a command area in the guest command buffer, and wherein the semaphore command is injected into a command area adjacent to a data area of the shadow command buffer if the fault occurred with respect to a data area in the guest command buffer.

13. The at least one non-transitory computer readable storage medium of claim 12, wherein the executable program instructions, when executed, cause the computing system to determine, based on a command boundary bitmap, whether the fault occurred with respect to the command area in the guest command buffer or the data area in the guest command buffer.

14. The at least one non-transitory computer readable storage medium of claim 11, wherein the code executing in the graphics hardware is to be self-modifying code.

15. The at least one non-transitory computer readable storage medium of claim 11, wherein the code executing in the graphics hardware is to be privileged code.

16. A method comprising:
setting a write protection flag in a guest command buffer associated with a virtual machine;
injecting a semaphore command into a shadow command buffer in response to a fault, wherein the fault corresponds to a write of a graphics command to the guest command buffer by code executing in graphics hardware;
conducting a security scan of the graphics command in response a context switch in the graphics hardware, wherein the context switch is associated with the semaphore command; and
overwriting the semaphore command with the graphics command if the security scan does not detect a security risk in the graphics command.

17. The method of claim 16, wherein the semaphore command is injected into a command area of the shadow command buffer if the fault occurred with respect to a command area in the guest command buffer, and wherein the semaphore command is injected into a command area adjacent to a data area of the shadow command buffer if the fault occurred with respect to a data area in the guest command buffer.

18. The method of claim 17, further including determining, based on a command boundary bitmap, whether the fault occurred with respect to the command area in the guest command buffer or the data area in the guest command buffer.

19. The method of claim 16, wherein the code executing in the graphics hardware is self-modifying code.

20. The method of claim 16, wherein the code executing in the graphics hardware is privileged code.

* * * * *